(12) United States Patent
Shimura

(10) Patent No.: US 11,667,805 B2
(45) Date of Patent: Jun. 6, 2023

(54) PROCESSING LIQUID COMPOSITION, COMPOSITION SET, PROCESSING METHOD, AND TEXTILE PRINTING METHOD

(71) Applicant: Seiko Epson Corporation, Tokyo (JP)

(72) Inventor: Kazuki Shimura, Shiojiri (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/705,712

(22) Filed: Mar. 28, 2022

(65) Prior Publication Data

US 2022/0315787 A1 Oct. 6, 2022

(30) Foreign Application Priority Data

Mar. 29, 2021 (JP) .............................. JP2021-054800

(51) Int. Cl.

| | | |
|---|---|---|
| *D06P 1/00* | (2006.01) | |
| *C09D 11/54* | (2014.01) | |
| *C09D 11/38* | (2014.01) | |
| *C09D 11/328* | (2014.01) | |
| *C09D 11/037* | (2014.01) | |
| *C09D 11/107* | (2014.01) | |
| *D06P 5/00* | (2006.01) | |
| *D06P 5/30* | (2006.01) | |
| *D06P 1/52* | (2006.01) | |
| *B41J 3/407* | (2006.01) | |
| *B41M 5/00* | (2006.01) | |
| *D06P 5/28* | (2006.01) | |
| *D06P 3/58* | (2006.01) | |

(52) U.S. Cl.
CPC .............. *C09D 11/54* (2013.01); *B41J 3/4078* (2013.01); *B41M 5/0023* (2013.01); *C09D 11/037* (2013.01); *C09D 11/107* (2013.01); *C09D 11/328* (2013.01); *C09D 11/38* (2013.01); *D06P 1/525* (2013.01); *D06P 5/002* (2013.01); *D06P 5/005* (2013.01); *D06P 5/30* (2013.01); *D06P 3/58* (2013.01)

(58) Field of Classification Search
CPC ..... C09D 11/54; C09D 11/037; C09D 11/107; C09D 11/328; C09D 11/38; C09D 11/106; B41J 3/4078; B41M 5/0023; B41M 5/0256; B41M 5/035; D06P 1/525; D06P 5/002; D06P 5/005; D06P 5/30; D06P 3/58; D06B 11/0076
USPC .............................................................. 8/189
See application file for complete search history.

(56) References Cited

U.S. PATENT DOCUMENTS 6,045,587 A * 4/2000 Cheng ...................... D01F 1/10
536/60

FOREIGN PATENT DOCUMENTS

| CN | 102911553 A | * | 2/2013 | ............. C09D 11/00 |
| CN | 106012506 A | * | 10/2016 | ............. D06M 11/79 |
| JP | 2001-081680 A | | 3/2001 | |
| JP | 2001-123373 A | | 5/2001 | |
| JP | 2019-183126 A | | 10/2019 | |
| KR | 101604272 B1 | * | 3/2016 | ............. C08F 220/06 |

\* cited by examiner

*Primary Examiner* — Eisa B Elhilo

(74) *Attorney, Agent, or Firm* — Harness, Dickey & Pierce, P.L.C.

(57) ABSTRACT

A processing liquid composition of the present disclosure subjected to textile printing and which is used by being attached to a fabric including fibers having a hydroxyl group, includes an oxazoline group-containing polymer and an aromatic carboxylic acid. An oxazoline value of the oxazoline group-containing polymer is preferably 100 or more and 600 or less.

12 Claims, No Drawings

PROCESSING LIQUID COMPOSITION, COMPOSITION SET, PROCESSING METHOD, AND TEXTILE PRINTING METHOD

The present application is based on, and claims priority from JP Application Serial Number 2021-054800, filed Mar. 29, 2021, the disclosure of which is hereby incorporated by reference herein in its entirety.

BACKGROUND

1. Technical Field

The present disclosure relates to a processing liquid composition, a composition set, a processing method, and a textile printing method.

2. Related Art

In recent years, ink jet printing applications have expanded and, in addition to printing machines for office and home use, there have also been applications to commercial printing, textile printing, and the like.

Ink jet inks including sublimable dyes having a sublimation property and disperse dyes are also used.

For these ink jet inks, there are direct printing methods, in which dyeing is carried out with a dye by a heating process such as steaming after the ink is applied to a fabric to be dyed, and thermal transfer printing methods, in which a dye ink is applied to an intermediate transfer medium and then, by heating, the dye is transferred by sublimation from the intermediate transfer medium side to a fabric to be dyed.

However, in the related art, when dyeing with an ink jet ink, it was necessary for the fabric to be formed of polyester fiber.

In order to obtain dyeability with respect to fabric formed of fibers other than polyester fibers, in particular, cellulose fibers, a method was proposed in which an aromatic acylation reaction is advanced by carrying out processing with an alkaline solution on a fabric including cellulose fibers and a process with a non-aqueous solution including an aromatic acylating agent (refer to JP-A-2001-123373).

However, there were cases where the method described above did not obtain sufficient color development. In addition, there were problems in that it was necessary to use a large amount of highly concentrated strong alkali and a large amount of aromatic acylating agents such as benzoyl chloride, which is poisonous, corrosive to the skin, and the like, and in terms of the safety, environmental impact, and the like.

SUMMARY

The present disclosure can be realized in the following aspects or application examples.

A processing liquid composition according to an application example of the present disclosure is a processing liquid composition subjected to textile printing and which is used by being attached to a fabric including fibers having a hydroxyl group, the composition including an oxazoline group-containing polymer, and an aromatic carboxylic acid.

In addition, in the processing liquid composition according to another application example of the present disclosure, an oxazoline value of the oxazoline group-containing polymer is 100 or more and 600 or less.

In addition, in the processing liquid composition according to another application example of the present disclosure, a content ratio of the oxazoline group-containing polymer in the processing liquid composition is 1.0% by mass or more and 10.0% by mass or less.

In addition, in the processing liquid composition according to another application example of the present disclosure, a content ratio of the aromatic carboxylic acid in the processing liquid composition is 0.1% by mass or more and 20.0% by mass or less.

In addition, in the processing liquid composition according to another application example of the present disclosure, the aromatic carboxylic acid is one or more selected from the group consisting of benzoic acid, 1-naphthalene carboxylic acid, 2-naphthalene carboxylic acid, and salts thereof.

In addition, in the processing liquid composition according to another application example of the present disclosure, the oxazoline group-containing polymer is a resin having a styrene-acrylic structure.

In addition, in the processing liquid composition according to another application example of the present disclosure, a glass transition temperature of the oxazoline group-containing polymer is 0° C. or higher.

In addition, in the processing liquid composition according to another application example of the present disclosure, there is a relationship of $0.1 \leq XP/XA \leq 40$ when a content ratio of the oxazoline group-containing polymer in the processing liquid composition is XP [% by mass] and a content ratio of the aromatic carboxylic acid in the processing liquid composition is XA [% by mass].

A composition set according to an application example of the present disclosure includes the processing liquid composition according to an application example of the present disclosure, and an ink jet dye textile printing ink composition containing a dye and water.

In addition, in the composition set according to another application example of the present disclosure, the dye is a disperse dye.

A processing method according to an application example of the present disclosure includes a processing liquid attaching step of attaching the processing liquid composition according to an application example of the present disclosure to a fabric including fibers having a hydroxyl group.

A textile printing method according to an application example of the present disclosure includes an ink composition attaching step of applying an ink jet dye textile printing ink composition containing a dye and water to an intermediate transfer medium by an ink jet method to form an image, and a transfer step of heating the intermediate transfer medium and a processed fabric, which is obtained by carrying out processing using the processing liquid composition according to an application example of the present disclosure on a fabric including fibers having a hydroxyl group, in a state where the intermediate transfer medium and the processed fabric face each other such that the image is transferred to the processed fabric.

DESCRIPTION OF EXEMPLARY EMBODIMENTS

A detailed description will be given below of suitable embodiments of the present disclosure.

1. Processing Liquid Composition

First, a description will be given of the processing liquid composition of the present disclosure.

The processing liquid composition of the present disclosure is a processing liquid composition used by being attached to a fabric for textile printing, in particular, a fabric including fibers having a hydroxyl group. The processing liquid composition of the present disclosure contains an oxazoline group-containing polymer and an aromatic carboxylic acid.

In this manner, the oxazoline group-containing polymer and the aromatic carboxylic acid being contained makes it possible to cause a dehydration condensation reaction between the hydroxyl group included in the fibers forming the fabric and the oxazoline group, as well as a reaction between the oxazoline group and the aromatic carboxylic acid. Due to this, it is possible to introduce aromatic functional groups derived from the aromatic carboxylic acid into the fabric. In this manner, introducing the aromatic functional groups into the fabric generally improves the affinity of the fabric with the dye having an aromatic ring structure, improves the dyeability of the dye, and provides excellent color development. In addition, since it is possible to introduce the aromatic functional group into the fabric by a covalent bond with strong bonding force, the dyed product obtained by the textile printing also has excellent fastness. In addition, it is not necessary to use hazardous or highly toxic substances such as strong alkalis or aromatic acylating agents, which is advantageous in terms of safety, environmental impact, and the like. In addition, suitable application is possible to the manufacturing of dyed products using simple equipment and steps.

1-1. Oxazoline Group-Containing Polymer

The processing liquid composition of the present disclosure includes an oxazoline group-containing polymer.

The oxazoline group-containing polymer is a component which mainly contributes to the reaction with hydroxyl groups included in the fibers forming the fabric and the reaction with an aromatic carboxylic acid and is a component which has a function of introducing the aromatic ring structure derived from the aromatic carboxylic acid into the fibers.

The oxazoline group-containing polymer may be any polymer which contains oxazoline groups in the molecule thereof, but the oxazoline value of the oxazoline group-containing polymer is preferably 100 or more and 600 or less, more preferably 200 or more and 590 or less, and even more preferably 300 or more and 580 or less.

Due to this, it is possible to cause the reactions described above to proceed more suitably while having a sufficiently excellent texture of the finally obtained dyed product and for the color development and fastness of the dyed product to be superior.

In this specification, the oxazoline value refers to the value indicated by X/Y when the weight average molecular weight of the oxazoline group-containing polymer is X and the number of oxazoline groups included per molecule of the oxazoline group-containing polymer is Y [number].

The oxazoline group-containing polymer may have any chemical structure as long as the other chemical structure has oxazoline groups and, for example, it is possible to use a resin having a styrene structure, a resin having an acrylic structure, a resin having a styrene-acrylic structure, or the like; however, a resin having at least a styrene structure is preferable, and a resin having a styrene-acrylic structure is more preferable.

Due to this, it is possible for the dyeability by the dye and color development of the fabric processed with the processing liquid composition to be superior. In particular, when disperse dyes are used as dyes, such effects are more remarkably exhibited. In addition, having an acrylic structure along with the styrene structure increases the intermolecular interaction for dyeing with disperse dyes and obtains superior dye-affinity and fastness.

As the oxazoline group-containing polymer, a plurality of materials may be used in combination.

The glass transition temperature of the oxazoline group-containing polymer is not particularly limited, but is preferably 0° C. or higher.

Due to this, it is possible for the fastness of dyed products manufactured using a fabric processed with the processing liquid composition of the present disclosure to be superior.

In particular, the glass transition temperature of the oxazoline group-containing polymer is more preferably 10° C. or higher and 100° C. or lower, and even more preferably 30° C. or higher and 80° C. or lower.

Due to this, the effects described above are more remarkably exhibited and it is possible for the flexibility of the oxazoline group-containing polymer to be superior and for the texture of a dyed product manufactured using a fabric processed with the processing liquid composition of the present disclosure to be superior.

The content ratio of the oxazoline group-containing polymer in the processing liquid composition of the present disclosure is preferably 1.0% by mass or more and 10.0% by mass or less, more preferably 1.5% by mass or more and 9.0% by mass or less, and even more preferably 2.0% by mass or more and 7.0% by mass or less.

Due to this, it is possible to cause the reactions described above to proceed more suitably while having a sufficiently excellent texture of the finally obtained dyed product and for the color development and fastness of the dyed product to be superior.

1-2. Aromatic Carboxylic Acid

The processing liquid composition of the present disclosure includes an aromatic carboxylic acid.

The aromatic carboxylic acid mainly has a function of introducing an aromatic ring structure into the fabric through the oxazoline group-containing polymer by reacting with the oxazoline group of the oxazoline group-containing polymer.

Aromatic carboxylic acids are acids which include, in the molecule, at least one of a carboxyl group and a salt structure thereof, along with an aromatic ring structure.

Examples of the aromatic ring structures which the aromatic carboxylic acid includes in the molecule include hydrocarbon ring structures such as benzene rings, naphthalene rings, anthracene rings, and annulene rings, and heterocyclic ring structures such as furan rings, thiophene rings, pyrrole rings, pyrazole rings, imidazole rings, pyridine rings, pyridazine rings, pyrimidine rings, pyrazine rings, and the like.

In addition, aromatic carboxylic acids may also be provided with a plurality of aromatic ring structures in the molecule.

The carboxyl group and the salt structure thereof may be directly bonded to the aromatic ring structure as described above in the molecule of the aromatic carboxylic acid, or may be bonded to the aromatic ring through at least one other atom.

In addition, the aromatic carboxylic acids may have one of at least one of the carboxyl groups and the salt structures thereof in the molecule, or may have a plurality thereof.

In addition, the processing liquid composition of the present disclosure may also include a plurality of aromatic carboxylic acids.

The aromatic carboxylic acids included in the processing liquid composition of the present disclosure are preferably one or more selected from the group consisting of benzoic acid, 1-naphthalene carboxylic acid, 2-naphthalene carboxylic acid, and salts thereof and more preferably one or more selected from the group consisting of benzoic acid salt, 1-naphthalene carboxylic acid salt, and 2-naphthalene carboxylic acid salt.

Due to this, it is possible for the reactivity with the oxazoline groups of the oxazoline group-containing polymer to be superior, the affinity between the fabric processed with the processing liquid composition of the present disclosure, that is, the processed fabric, and the dye, is superior, the dyeability of the dye is further improved, and the color development is superior.

In particular, when the aromatic carboxylic acid is a salt, it is possible for the solubility in water to be superior and for the dissolution stability of the aromatic carboxylic acid in the processing liquid composition of the present disclosure to be superior and it is possible to more effectively prevent unwanted precipitation of the aromatic carboxylic acid and the generation of unwanted variations in concentration in the processing liquid composition of the present disclosure. As a result, it is possible to perform the processing of the fabric more stably, it is possible for the color development and fastness of the finally obtained dyed product to be superior, and it is possible to more effectively prevent the generation of unwanted color irregularities in the dyed product or the like. In addition, it is possible for the storage stability of the processing liquid composition of the present disclosure to be superior and it is possible to suitably use the processing liquid composition of the present disclosure for the processing of fabrics and manufacturing of dyed products even in a case of storing for a long period of time or the like.

When the aromatic carboxylic acid included in the processing liquid composition of the present disclosure is a salt of a carboxylic acid, examples of such salts include lithium salts, sodium salts, potassium salts, magnesium salts, calcium salts, ammonium salts, and the like.

The content ratio of the aromatic carboxylic acid in the processing liquid composition of the present disclosure is preferably 0.1% by mass or more and 20.0% by mass or less, more preferably 0.2% by mass or more and 9.0% by mass or less, and even more preferably 0.3% by mass or more and 5.0% by mass or less.

Due to this, it is possible to cause the reaction between the aromatic carboxylic acid and the oxazoline group-containing polymer to proceed more suitably, to reduce the amount of aromatic carboxylic acid remaining as an unreacted component after the reaction, and to make the color development of dyed products manufactured using the processing liquid composition of the present disclosure superior.

When the content ratio of the oxazoline group-containing polymer in the processing liquid composition of the present disclosure is XP [% by mass] and the content ratio of the aromatic carboxylic acid in the processing liquid composition is XA [% by mass], a relationship of $0.1 \leq XP/XA \leq 40$ is preferable, a relationship of $0.4 \leq XP/XA \leq 30$ is more preferable, and a relationship of $2.0 \leq XP/XA \leq 10$ is even more preferable.

Due to this, it is possible to cause the reaction between the aromatic carboxylic acid and the oxazoline group-containing polymer to proceed more suitably, to reduce the amount of aromatic carboxylic acid and unreacted oxazoline groups remaining as unreacted components after the reaction, and to make the color development of dyed products manufactured using the processing liquid composition of the present disclosure superior.

1-3. Water

The processing liquid composition of the present disclosure usually includes water in addition to the oxazoline group-containing polymer and aromatic carboxylic acid.

Water is mainly a component which functions as a solvent and dispersant for the oxazoline group-containing polymer and aromatic carboxylic acid in the processing liquid composition of the present disclosure. In addition, when the processing liquid composition of the present disclosure includes water, it is possible to more suitably perform the processing of the fabric with the processing liquid composition of the present disclosure.

As water, for example, pure water such as RO water, distilled water, or ion exchange water may be used.

The content ratio of water in the processing liquid composition of the present disclosure is preferably 70.0% by mass or more and 98.9% by mass or less, more preferably 73.0% by mass or more and 97.0% by mass or less, and even more preferably 75.0% by mass or more and 96.0% by mass or less.

Due to this, it is possible to adjust the viscosity and fluidity of the processing liquid composition to suitable values more reliably and to more suitably perform the processing of the fabric.

1-4. Polyvalent Carbodiimide Compound

The processing liquid composition of the present disclosure may further include a polyvalent carbodiimide compound.

Due to this, dyed products manufactured using the fabric processed with the processing liquid composition of the present disclosure have superior color development.

The polyvalent carbodiimide compound may be any compound having two or more carbodiimide structures, that is, —N=C=N— structures, in the molecule and examples thereof include polycarbodiimide-based resins and the like.

Examples of commercially available products of polyvalent carbodiimide compounds include V-02, V-02-L2, SV-02, V-04, V-10, SW-12G, E-02, E-03A, E-05 (the above are all manufactured by Nisshinbo Chemical Inc.), and the like.

The NCN equivalent of the polyvalent carbodiimide compound is preferably 600 or less, more preferably 100 or more and 580 or less, and even more preferably 200 or more and 550 or less.

Due to this, it is possible to make the color development of dyed products manufactured using a fabric processed with the processing liquid composition of the present disclosure superior while the storage stability of the processing liquid composition of the present disclosure is superior.

In the present specification, NCN equivalent refers to the value indicated by X/Y, when the molecular weight of the polyvalent carbodiimide compound is X and the number of carbodiimide structures contained per molecule of the polyvalent carbodiimide compound is Y [number].

The content ratio of the polyvalent carbodiimide compound in the processing liquid composition of the present disclosure is preferably 0.1% by mass or more and 20.0% by mass or less, more preferably 0.5% by mass or more and 15.0% by mass or less, and even more preferably 0.8% by mass or more and 7.0% by mass or less.

Due to this, it is possible to make the color development of dyed products manufactured using a fabric processed with the processing liquid composition of the present disclosure superior while the storage stability of the processing liquid composition of the present disclosure is superior.

When the content ratio of the oxazoline group-containing polymer in the processing liquid composition of the present disclosure is XP [% by mass] and the content ratio of the polyvalent carbodiimide compound in the processing liquid composition is XC [% by mass], a relationship of $0.01 \leq XC/XP \leq 10.0$ is preferable, a relationship of $0.05 \leq XC/XP \leq 5.0$ is more preferable, and a relationship of $0.10 \leq XC/XP \leq 2.5$ is even more preferable.

Due to this, it is possible to make the color development of dyed products manufactured using a fabric processed with the processing liquid composition of the present disclosure superior while the storage stability of the processing liquid composition of the present disclosure is superior.

1-5. Non-Aromatic Organic Acid

The processing liquid composition of the present disclosure may further include a non-aromatic organic acid.

Due to this, it is possible to more effectively suppress unwanted yellowing or the like of fabrics processed with the processing liquid composition of the present disclosure, that is, processed fabrics and dyed products manufactured using the processing liquid composition of the present disclosure, while ensuring sufficiently excellent dye-affinity and fastness of dyed products manufactured using the processing liquid composition of the present disclosure.

The non-aromatic organic acid may be an acid which does not have an aromatic ring structure in the molecule thereof and examples thereof include acetic acid, malic acid, citric acid, adipic acid, succinic acid, lactic acid, N,N-bis(2-hydroxyethyl)-2-aminoethanesulfonic acid (BES), 4-(2-hydroxyethyl)-1-piperazineethanesulfonic acid (HEPES), morpholinoethanesulfonic acid (MES), carbamoylmethyliminobisacetic acid (ADA), piperazine-1,4-bis(2-ethanesulfonic acid) (PIPES), N-(acetamido)-2-aminoethanesulfonic acid (ACES), coramine hydrochloride, N-tris (hydroxymethyl)methyl-2-aminoethanesulfonic acid (TES), and the like. Among the above, at least one selected from the group consisting of acetic acid, malic acid, and citric acid is preferable.

Due to this, the effect of using a non-aromatic organic acid as described above is more remarkably exhibited.

The content ratio of the non-aromatic organic acid in the processing liquid composition of the present disclosure is preferably 0.01% by mass or more and 0.5% by mass or less, more preferably 0.02% by mass or more and 0.4% by mass or less, and even more preferably 0.03% by mass or more and 0.3% by mass or less.

Due to this, the effect as described above is more remarkably exhibited.

1-6. Other Components

The processing liquid composition of the present disclosure may include components other than the components described above. Such components are also referred to below as "other components" in this section.

Examples of other components include chelating agents, preservatives, fungicides, rust inhibitors, flame retardants, various dispersants, water-soluble organic solvents, surfactants, antioxidants, UV absorbers, oxygen absorbers, dissolution aids, penetrating agents, and the like.

Examples of chelating agents include ethylenediaminetetraacetic acid salts and the like. In addition, examples of preservatives and fungicides include sodium benzoate, sodium pentachlorophenol, sodium 2-pyridine thiol-1-oxide, sodium sorbate, sodium dehydroacetate, 1,2-dibenzoisothiazolin-3-one, 4-chloro-3-methylphenol, and the like. In addition, examples of rust inhibitors include benzotriazole and the like.

As surfactants, for example, it is possible to use various surfactants such as anionic surfactants, cationic surfactants, nonionic surfactants, and the like.

The content ratio of other components is preferably 5.0% by mass or less and more preferably 1.0% by mass or less.

1-7. Other

The pH of the processing liquid composition of the present disclosure at 25° C. is preferably 6 or more and 11 or less and more preferably 7 or more and 10 or less.

Due to this, it is possible for the storage stability of the processing liquid composition of the present disclosure to be superior.

2. Composition Set

Next, a description will be given of the composition set of the present disclosure.

The composition set of the present disclosure is provided with the processing liquid composition of the present disclosure described above and an ink jet dye textile printing ink composition containing a dye and water.

Due to this, it is possible to provide a composition set able to be suitably used for the manufacturing of dyed products having excellent color development and fastness. In addition, it is not necessary to use hazardous or highly toxic substances such as strong alkalis or aromatic acylating agents, which is advantageous in terms of safety, environmental impact, and the like. In addition, suitable application is possible to the manufacturing of dyed products using simple equipment and steps.

Since the processing liquid composition forming the composition set of the present disclosure was described in the above-described section 1, a description will be given below of the ink jet dye textile printing ink composition.

2-1. Ink Jet Dye Textile Printing Ink Composition

The ink jet dye textile printing ink composition forming the composition set of the present disclosure contains a dye and water. In particular, the ink jet dye textile printing ink composition forming the composition set of the present disclosure is used for manufacturing dyed products by being applied to a fabric processed with the processing liquid composition of the present disclosure.

In this specification, the ink jet dye textile printing ink composition refers to a composition ejected by the ink jet method and used for dyeing a fabric.

The ink jet dye textile printing ink composition may be directly applied to the fabric processed with the processing liquid composition of the present disclosure by the ink jet method, or may be indirectly applied to the fabric processed with the processing liquid composition of the present disclosure by being applied to an intermediate transfer medium by the ink jet method and then transferring an image formed on the intermediate transfer medium thereto.

2-1-1. Dye

The ink jet dye textile printing ink composition forming the composition set of the present disclosure includes a dye.

Examples of dyes include disperse dyes, acid dyes, basic dyes, direct dyes, reactive dyes, and the like.

The disperse dyes are not particularly limited and examples thereof include C.I. Disperse Yellow 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 202, 204, 210, 211, 215, 216, 218, 224, 227, 231, and 232; C.I. Disperse Orange 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 66, 71, 73, 76, 78, 80, 89, 90, 91, 93, 96, 97, 119, 127, 130, 139, and 142; C.I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 298, 302, 303, 310, 311, 312, 320, 324, 328; C.I. Disperse Violet 1, 4, 8, 23, 26, 27, 28, 31, 33, 35, 36, 38, 40, 43, 46, 48, 50, 51, 52, 56, 57, 59, 61, 63, 69, and 77; C.I. Disperse Green 9, C.I. Disperse Brown 1, 2, 4, 9, 13, and 19; C.I. Disperse Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, 333, 359, and 360; and C.I. Disperse Black 1, 3, 10, and 24.

The acid dyes are not particularly limited and examples thereof include C.I. Acid Yellow 1, 3, 6, 11, 17, 18, 19, 23, 25, 36, 38, 40, 40:1, 42, 44, 49, 59, 59:1, 61, 65, 67, 72, 73, 79, 99, 104, 159, 169, 176, 184, 193, 200, 204, 207, 215, 219, 219:1, 220, 230, 232, 235, 241, 242, and 246; C.I. Acid Orange 3, 7, 8, 10, 19, 22, 24, 33, 51, 51S, 56, 67, 74, 80, 86, 87, 88, 89, 94, 95, 107, 108, 116, 122, 127, 140, 142, 144, 149, 152, 156, 162, 166, and 168; C.I. Acid Red 1, 6, 8, 9, 13, 18, 27, 35, 37, 52, 54, 57, 60, 73, 82, 88, 97, 97:1, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, and 415; C.I. Acid Violet 17, 19, 21, 42, 43, 47, 48, 49, 54, 66, 78, 90, 97, 102, 109, and 126; C.I. Acid Blue 1, 7, 9, 15, 23, 25, 40, 61:1, 62, 72, 74, 80, 83, 90, 92, 103, 104, 112, 113, 114, 120, 127, 127:1, 128, 129, 138, 140, 142, 156, 158, 171, 182, 185, 193, 199, 201, 203, 204, 205, 207, 209, 220, 221, 224, 225, 229, 230, 239, 258, 260, 264, 277:1, 278, 279, 280, 284, 290, 296, 298, 300, 317, 324, 333, 335, 338, 342, and 350; C.I. Acid Green 9, 12, 16, 19, 20, 25, 27, 28, 40, 43, 56, 73, 81, 84, 104, 108, and 109; C.I. Acid Brown 2, 4, 13, 14, 19, 28, 44, 123, 224, 226, 227, 248, 282, 283, 289, 294, 297, 298, 301, 355, 357, and 413; C.I. Acid Black 1, 2, 3, 24, 24:1, 26, 31, 50, 52, 52:1, 58, 60, 63, 63S, 107, 109, 112, 119, 132, 140, 155, 172, 187, 188, 194, 207, 222, and the like.

The basic dyes are not particularly limited and examples thereof include C.I. Basic Yellow 1, 2, 13, 19, 21, 25, 32, 36, 40, and 51; C.I. Basic Red 1, 5, 12, 19, 22, 29, 37, 39, and 92; C.I. Basic Blue 1, 3, 9, 11, 16, 17, 24, 28, 41, 45, 54, 65, and 66; C.I. Basic Black 2, 8, and the like.

The direct dyes are not particularly limited and examples thereof include C.I. Direct Yellow 8, 9, 10, 11, 12, 22, 27, 28, 39, 44, 50, 58, 86, 87, 98, 105, 106, 130, 137, 142, 147, and 153; C.I. Direct Orange 6, 26, 27, 34, 39, 40, 46, 102, 105, 107, and 118; C.I. Direct Red 2, 4, 9, 23, 24, 31, 54, 62, 69, 79, 80, 81, 83, 84, 89, 95, 212, 224, 225, 226, 227, 239, 242, 243, and 254; C.I. Direct Violet 9, 35, 51, 66, 94, and 95; C.I. Direct Blue 1, 15, 71, 76, 77, 78, 80, 86, 87, 90, 98, 106, 108, 160, 168, 189, 192, 193, 199, 200, 201, 202, 203, 218, 225, 229, 237, 244, 248, 251, 270, 273, 274, 290, and 291; C.I. Direct Green 26, 28, 59, 80, and 85; C.I. Direct Brown 44, 44:1, 106, 115, 195, 209, 210, 212:1, 222, and 223; C.I. Direct Black 17, 19, 22, 32, 51, 62, 108, 112, 113, 117, 118, 132, 146, 154, 159, 169, and the like.

The reactive dyes are not particularly limited and examples thereof include C.I. Reactive Yellow 2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, and 176; C.I. Reactive Orange 1, 4, 5, 7, 11, 12, 13, 15, 16, 20, 30, 35, 56, 64, 67, 69, 70, 72, 74, 82, 84, 86, 87, 91, 92, 93, 95, 99, and 107; C.I. Reactive Red 2, 3, 3:1, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 226, 228, 235, and 245; C.I. Reactive Violet 1, 2, 4, 5, 6, 22, 23, 33, 36, and 38; C.I. Reactive Blue 2, 3, 4, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, and 236; C.I. Reactive Green 8, 12, 15, 19, and 21; C.I. Reactive Brown 2, 7, 9, 10, 11, 17, 18, 19, 21, 23, 31, 37, 43, and 46; C.I. Reactive Black 5, 8, 13, 14, 31, 34, 39, and the like.

Among the above, the dye included in the ink jet dye textile printing ink composition forming the composition set of the present disclosure is preferably a disperse dye.

Due to this, the effect according to the present disclosure as described above is more remarkably exhibited.

The content ratio of the coloring material in the ink jet dye textile printing ink composition is not particularly limited, but is preferably 1.0% by mass or more and 10.0% by mass or less and more preferably 1.0% by mass or more and 8.0% by mass or less.

Due to this, it is easier to secure sufficient color concentration in a recording section formed using the ink jet dye textile printing ink composition and it is also possible to make the ink jet dye textile printing ink composition have superior high temperature stability, storage stability, ejection stability, clogging recovery, and the like.

2-1-2. Water

The ink jet dye textile printing ink composition forming the composition set of the present disclosure includes water.

Water is a component which functions as a solvent to dissolve, or a dispersant to disperse, solid content such as dyes in the ink jet dye textile printing ink composition, for example.

As the water, pure water such as RO water, distilled water, ion exchange water, or the like may be used, for example.

The content ratio of the water in the ink jet dye textile printing ink composition is preferably 50.0% by mass or more and 98.0% by mass or less, more preferably 55.0% by mass or more and 95.0% by mass or less, and even more preferably 60.0% by mass or more and 92.0% by mass or less.

Due to this, it is possible to more reliably adjust the viscosity of the ink jet dye textile printing ink composition to a suitable value and to further improve the ejection stability by the ink jet method.

2-1-3. Water-Soluble Organic Solvent

The ink jet dye textile printing ink composition forming the composition set of the present disclosure may include a water-soluble organic solvent.

Due to this, it is possible to improve the moisture retention property of the ink jet dye textile printing ink composition and to more effectively prevent the solid content of the ink jet dye textile printing ink composition from unwantedly precipitating or the like due to drying or the like in the ink jet head or the like. In addition, it is possible to more suitably adjust the viscosity of the ink jet dye textile printing ink composition. As a result, it is possible for the ejection stability of the ink jet dye textile printing ink composition by the ink jet method to be superior.

The water-soluble organic solvent may be any organic solvent which exhibits solubility in water and, for example, it is possible to suitably use an organic solvent having a solubility in water of 10 g/100 g water or more at 20° C.

The boiling point of the water-soluble organic solvent at 1 atm is preferably 150° C. or higher and 350° C. or lower.

Due to this, it is possible to further improve the moisture retention property of the ink jet dye textile printing ink composition and to more effectively prevent the solid content of the ink jet dye textile printing ink composition from unwantedly precipitating or the like due to drying or the like in the ink jet head or the like. As a result, it is possible for the ejection stability of the ink jet dye textile printing ink composition by the ink jet method to be superior. In addition, after the ink jet dye textile printing ink composition is ejected, it is possible to carry out volatilization relatively easily when necessary and to effectively prevent the water-soluble organic solvent from unwantedly remaining in the dyed product to be manufactured.

Examples of such water-soluble organic solvents include alkyl monoalcohols, alkyl diols, glycerin, glycols, glycol monoethers, lactams, and the like and it is possible to use one or two or more selected from the above in combination.

Examples of glycols include triethanolamine, ethylene glycol, diethylene glycol, triethylene glycol, propylene glycol, and the like. In addition, examples of glycol monoethers include triethylene glycol monobutyl ether and the like. In addition, examples of lactams include 2-pyrrolidone, 1-(2-hydroxyethyl)-2-pyrrolidone, and the like.

The content ratio of the water-soluble organic solvent in the ink jet dye textile printing ink composition is preferably 1.0% by mass or more and 50.0% by mass or less, more preferably 3.0% by mass or more and 45.0% by mass or less, and even more preferably 5.0% by mass or more and 40.0% by mass or less.

Due to this, it is possible to more reliably adjust the viscosity of the ink jet dye textile printing ink composition to a suitable value and to further improve the ejection stability by the ink jet method.

2-1-4. Surfactant

The ink jet dye textile printing ink composition forming the composition set of the present disclosure may include a surfactant.

Examples of the surfactant include various anionic surfactants, cationic surfactants, nonionic surfactants, and the like and it is possible to use one or two or more selected from the above in combination.

The content ratio of the surfactant in the ink jet dye textile printing ink composition is preferably 0.1% by mass or more and 2.5% by mass or less, more preferably 0.1% by mass or more and 2.0% by mass or less, and even more preferably 0.1% by mass or more and 1.5% by mass or less.

2-1-5. Resin Material

The ink jet dye textile printing ink composition forming the composition set of the present disclosure may include a resin material.

Due to this, for example, when a dyed product is manufactured by the second method as described below, it is possible for the fixation of the recording section by the dye and fastness of the dyed product to be superior.

As the resin material, for example, it is possible to use a polyester resin, a urethane-based resin, an acrylstyrene copolymer resin, or the like.

The content ratio of the resin material in the ink jet dye textile printing ink composition is preferably 0.1% by mass or more and 15.0% by mass or less, more preferably 0.5% by mass or more and 10.0% by mass or less, and even more preferably 0.5% by mass or more and 8.0% by mass or less.

Due to this, it is possible for the fastness of the dyed product to be superior while having a sufficiently excellent texture of the finally obtained dyed product.

2-1-6. Other Components

The ink jet dye textile printing ink composition forming the composition set of the present disclosure may include components other than the components described above. Such components are also referred to below as "other components" in this section.

Examples of other components include chelating agents, preservatives, fungicides, rust inhibitors, flame retardants, various dispersants, antioxidants, UV absorbers, oxygen absorbers, dissolution aids, penetrating agents, and the like.

Examples of chelating agents include ethylenediaminetetraacetic acid salts and the like. In addition, examples of preservatives and fungicides include sodium benzoate, sodium pentachlorophenol, sodium 2-pyridine thiol-1-oxide, sodium sorbate, sodium dehydroacetate, 1,2-dibenzoisothiazolin-3-one, 4-chloro-3-methylphenol, and the like. In addition, examples of rust inhibitors include benzotriazole and the like.

The content ratio of the other components is preferably 5.0% by mass or less, and 1.0% by mass or less is more preferable.

2-1-7. Others

The surface tension of the ink jet dye textile printing ink composition forming the composition set of the present disclosure at 25° C. is not particularly limited, but is preferably 20 mN/m or more and 60 mN/m or less, more preferably 25 mN/m or more and 50 mN/m or less, and even more preferably 30 mN/m or more and 40 mN/m or less.

Due to this, it is more difficult for clogging or the like to occur in the nozzles of the ink jet head and the ejection stability of the ink jet dye textile printing ink composition is further improved. In addition, even when nozzle clogging occurs, it is possible for the recovery by capping the nozzles to be superior.

As for the surface tension, it is possible to adopt a value measured by the Wilhelmy method or the ring method. For the measurement of the surface tension, it is possible to use a surface tension meter (for example, DY-300, DY-500, DY-700, and the like, manufactured by Kyowa Interface Science Co., Ltd.).

The viscosity at 25° C. of the ink jet dye textile printing ink composition forming the composition set of the present disclosure is preferably 2 mPa·s or more and 10 mPa·s or less and more preferably 3 mPa·s or more and 8 mPa·s or less.

Due to this, the ejection stability of the ink jet dye textile printing ink composition by the ink jet method is superior.

It is possible to determine the viscosity by measuring with an oscillating viscometer, a rotating viscometer, a thin tube viscometer, or a falling-ball viscometer. For example, with an oscillating viscometer, it is possible to carry out the determination by measurement in accordance with JIS Z8809.

The ink jet dye textile printing ink composition forming the composition set of the present disclosure may be for ejection by an ink jet method and examples of ink jet methods include a charge deflection method, a continuous method, on-demand methods such as a piezo method or a bubble jet (registered trademark) method, and the like, but, in particular, the ink jet dye textile printing ink composition is preferably ejected from an ink jet head using a piezo oscillator.

Due to this, it is possible to more effectively prevent denaturation of the coloring material in the ink jet head and to make the ejection stability by the ink jet method superior.

2-2. Others

The composition set of the present disclosure may be provided with at least one processing liquid composition of the present disclosure and the ink jet dye textile printing ink composition, respectively. In other words, the composition set of the present disclosure may be provided with a plurality of the processing liquid compositions of the present disclosure and may be provided with a plurality of ink jet dye textile printing ink compositions.

The composition set of the present disclosure is preferably provided with three ink jet dye textile printing ink compositions corresponding to three primary colors, that is, cyan, magenta, and yellow. The three primary colors may be more finely divided according to the color concentrations thereof. For example, in addition to cyan, magenta, and yellow, light cyan, light magenta, and light yellow may be provided.

The composition set of the present disclosure may also be provided with an achromatic ink jet dye textile printing ink composition, more specifically, a black ink.

In addition to the processing liquid composition of the present disclosure and an ink jet dye textile printing ink composition, the composition set of the present disclosure may also be provided with compositions other than the above.

3. Processing Method

Next, a description will be given of the processing method of the present disclosure.

The processing method of the present disclosure, that is, the method for manufacturing a processed fabric, includes a processing liquid attaching step in which the processing liquid composition of the present disclosure is attached to a fabric including fibers having a hydroxyl group.

Due to this, it is possible to provide a processing method which is able to obtain a processed fabric able to be suitably used for the manufacturing of dyed products with excellent color development and fastness. In addition, it is not necessary to use hazardous or highly toxic substances such as strong alkalis or aromatic acylating agents, which is advantageous in terms of safety, environmental impact, and the like. In addition, suitable application is possible to the manufacturing of processed fabrics and the manufacturing of dyed products using simple equipment and steps.

3-1. Fabric

A description will be given below of the fabric to which the processing liquid composition of the present disclosure is attached.

The fabric may include fibers having a hydroxyl group. Examples of such fibers include synthetic fibers such as polyester fibers, semi-synthetic fibers such as acetate fibers, regenerated fibers such as cellulose fibers such as rayon, and natural fibers such as cotton, silk, and wool, and the like and the fabric may be a blend using two or more selected from the above. In addition, blends of fibers having a hydroxyl group and fibers not having hydroxyl groups may be used. As the fiber having hydroxyl groups, cotton is particularly preferable. When the fiber having hydroxyl groups is cotton, using the processing liquid composition of the present disclosure makes it possible to improve the dyeability of the disperse dye with respect to cotton and to make the color development excellent in particular.

As the fabric, for example, it is possible to use various kinds of fabrics such as plain weave, twill weave, satin, varied plain weave, varied twill weave, varied satin, varied weave, patterned weave, single layer weave, double weave, multiple weaves, warp pile weave, weft pile weave, intertwined weave, and the like.

In addition, it is possible to set the thickness of the fibers forming the fabric, for example, to 10d or more and 100d or less.

3-2. Processing Liquid Attaching Step

In the processing liquid attaching step, the processing liquid composition of the present disclosure described above is attached to a fabric including fibers having a hydroxyl group.

In this step, the processing liquid composition may be applied to the entire fabric or may be selectively applied to only a part thereof, but it is preferable to apply the processing liquid composition to at least the entire area to be dyed.

In this step, the processing liquid composition may be applied to the fabric by any method and examples of methods for applying the processing liquid composition to the fabric include an immersion method, a spraying method, an ink jet method, and the like.

This step may be performed, for example, with the processing liquid composition in a heated state.

Due to this, for example, when the processing liquid composition includes solid content with low solubility, it is possible to put the solid content into a more suitably dissolved state, in addition, it is easier for the processing liquid composition to penetrate into the gaps between the fibers of the fabric and it is possible to set the surface of the fibers forming the fabric into a state of being suitably wetted with the processing liquid composition. From the above, it is possible for the effect of the present disclosure to be more remarkably exhibited.

The temperature of the processing liquid composition in this step is not particularly limited, but 10° C. or higher and 90° C. or lower is preferable, 15° C. or higher and 80° C. or lower is more preferable, and 20° C. or higher and 70° C. or lower is even more preferable.

The amount of the processing liquid composition applied to the fabric in this step is not particularly limited, but a ratio of 50% or more and 200% or less of the mass of the fabric before the processing liquid composition is applied is preferable.

Due to this, it is possible to cause the reactions as described above to proceed more suitably and to simplify the step of removing the excess processing liquid composition and the components thereof.

The amount of the processing liquid composition applied to the fabric may be adjusted by, for example, pressing the fabric or the like after an excess amount of the processing liquid composition is applied to the fabric. More specifically, for example, the fabric may be immersed into the processing liquid composition and then pressed with a mangle roller to achieve a predetermined drawing ratio.

It is possible to express the drawing ratio T [%] described above as $T=[(X1-X0)/X0]\times 100$, when the fabric mass before applying the processing liquid composition is X0 [kg] and the fabric mass after applying the processing liquid composition, that is, the fabric mass at the end of this step, is X1 [kg].

3-3. Reaction Step

After the processing liquid attaching step, the processing method of the present disclosure may have a reaction step in which the fibers forming the fabric to which the processing liquid composition is applied, the oxazoline group-containing polymer, and the aromatic carboxylic acid react with each other.

After the processing liquid attaching step, when the desired reaction proceeds sufficiently without a separate reaction step being provided, this step may be omitted.

It is possible to suitably perform the reaction step, for example, by a heating process.

Due to this, it is possible for the reaction described above to proceed and to suitably remove volatile components such as moisture, subsequent handling of the fabric becomes easier, and it is possible to effectively prevent unwanted blotting and the like of the ink jet dye textile printing ink composition from occurring when the ink jet dye textile printing ink composition is applied to the fabric processed with the processing liquid composition of the present disclosure.

When the reaction step is performed by a heating process, the heating temperature is preferably 70° C. or higher and 250° C. or lower, more preferably 80° C. or higher and 220° C. or lower, and even more preferably 100° C. or higher and 200° C. or lower.

Due to this, it is possible for the reaction to proceed more suitably while effectively preventing unwanted denaturation, degradation, and the like of the fabric and the constituent components of the processing liquid composition. In addition, it is possible to suitably remove the volatile components such as water included in the fabric to which the processing liquid composition is applied. In addition, the above is also preferable from the viewpoint of energy saving.

When the reaction step is carried out by a heating process, the heating time is preferably 20 seconds or more and 1200 seconds or less, more preferably 30 seconds or more and 600 seconds or less, and even more preferably 60 seconds or more and 300 seconds or less.

Due to this, it is possible to cause the reactions to proceed more suitably while effectively preventing unwanted denaturation, degradation, and the like of the fabric and the constituent components of the processing liquid composition. In addition, it is possible to suitably remove the volatile components such as water included in the fabric to which the processing liquid composition is applied. In addition, the above is also preferable from the viewpoints of the productivity of the processed fabric and of energy saving.

In addition, the reaction step may be performed in a plurality of stages under different conditions.

More specifically, in the reaction step, for example, a first heating process, the main purpose of which is to remove moisture, and a second heating process, the main purpose of which is the reaction as described above, may be performed.

In such a case, the heating temperature in the first heating process is preferably 70° C. or higher and 160° C. or lower, more preferably 80° C. or higher and 150° C. or lower, and even more preferably 100° C. or higher and 140° C. or lower.

In addition, the heating time in the first heating process is preferably 10 seconds or more and 600 seconds or less, more preferably 15 seconds or more and 300 seconds or less, and even more preferably 30 seconds or more and 180 seconds or less.

In addition, the heating temperature in the second heating process is preferably 120° C. or higher and 250° C. or lower, more preferably 130° C. or higher and 220° C. or lower, and even more preferably 140° C. or higher and 200° C. or lower.

In addition, the heating time in the second heating process is preferably 10 seconds or more and 600 seconds or less, more preferably 15 seconds or more and 300 seconds or less, and even more preferably 30 seconds or more and 180 seconds or less.

3-4. Washing Step

The processing method of the present disclosure may have a washing step of washing the fabric after the processing liquid attaching step, more specifically, after the reaction step described above, for example.

Due to this, for example, it is possible to remove unreacted components, unnecessary components, and the like from on the fabric and to perform more suitable dyeing with the ink jet dye textile printing ink composition.

Examples of the washing step include alkaline washing, acid washing, water rinsing, organic solvent washing, and the like, and two or more selected from the above may be combined.

When at least water rinsing is performed in the washing step, the water rinsing is preferably performed using running water.

3-5. Drying Step

In addition, the processing method of the present disclosure may also have a drying step of drying the fabric after the processing liquid attaching step, more specifically, after the washing step described above, for example.

Due to this, subsequent handling of the fabric becomes easier and it is possible to effectively prevent unwanted blotting and the like of the ink jet dye textile printing ink composition from occurring when the ink jet dye textile printing ink composition is applied to a fabric processed with the processing liquid composition of the present disclosure.

It is possible to suitably perform the drying step, for example, by a heating process.

Due to this, for example, it is possible to cause the reactions described above, in particular, the reaction between the fibers forming the fabric and the oxazoline group-containing polymer to further proceed, to increase the reaction points between the fibers and the oxazoline group-containing polymer, and to make the bonding force between the fibers and the oxazoline group-containing polymer superior.

The heating temperature in the drying step is preferably 100° C. or higher and 200° C. or lower and more preferably 100° C. or higher and 140° C. or lower.

The heating time in the drying step is preferably 15 seconds or more and 300 seconds or less and more preferably 30 seconds or more and 180 seconds or less.

4. Textile Printing Method

Next, a description will be given of the textile printing method of the present disclosure.

4-1. First Method

The textile printing method of the present disclosure, that is, the method for manufacturing a dyed product, has an ink composition attaching step in which an ink jet dye textile printing ink composition containing a dye and water is applied to an intermediate transfer medium by an ink jet method to form an image, and a transfer step in which the intermediate transfer medium and a processed fabric, which is obtained by carrying out processing using the processing liquid composition of the present disclosure on a fabric including fibers having a hydroxyl group, are heated in a state where the intermediate transfer medium and the processed fabric face each other such that the image is transferred to the processed fabric.

Due to this, it is possible to provide a textile printing method which is able to manufacture dyed products with excellent color development and fastness. In addition, it is not necessary to use hazardous or highly toxic substances such as strong alkalis or aromatic acylating agents, which is advantageous in terms of safety, environmental impact, and the like. In addition, suitable application is possible to the manufacturing of dyed products using simple equipment and steps.

4-1-1. Ink Composition Attaching Step

In the ink composition attaching step, an ink jet dye textile printing ink composition containing a dye and water is applied to the intermediate transfer medium by an ink jet method to form an image. A plurality of ink jet textile printing ink compositions, for example, a plurality of ink jet dye textile printing ink compositions, may be used to form the image.

As the ink jet method for ejecting the ink jet dye textile printing ink composition, any method may be used and examples thereof include a charge deflection method, a continuous method, on-demand methods such as a piezo method or a bubble jet (registered trademark) method, and the like.

As an intermediate transfer medium, for example, it is possible to use paper such as plain paper, a recording medium provided with an ink-receiving layer, for example, a recording medium termed as ink jet special paper, coated paper, and the like.

4-1-2. Transfer Step

In the transfer step, the intermediate transfer medium and a processed fabric, which is obtained by carrying out processing using the processing liquid composition of the present disclosure on a fabric including fibers having a hydroxyl group, are heated in a state where the intermediate transfer medium and the processed fabric face each other such that the image is transferred to the processed fabric.

As the processed fabric, it is possible to use the processed fabric obtained by the processing method described in the above-described section 4.

The heating temperature in this step is not particularly limited, but is preferably 160° C. or higher and 230° C. or lower and more preferably 170° C. or higher and 210° C. or lower.

Due to this, it is possible to reduce the energy required for the transfer and to further improve the productivity of the dyed product. In addition, it is possible to further improve the color development and fastness of the obtained dyed product.

The heating time in this step depends on the heating temperature, but is preferably 30 seconds or more and 90 seconds or less and more preferably 30 seconds or more and 60 seconds or less.

Due to this, it is possible to reduce the energy required for the transfer and to further improve the productivity of the dyed product. In addition, it is possible to further improve the color development and fastness of the obtained dyed product.

In addition, this step may be performed by carrying out heating in a state where the surface of the intermediate transfer medium to which the ink jet dye textile printing ink composition is attached and the processed fabric face each other while being separated by a certain distance, or may be performed by heating in a state of being closely attached to the surface of the processed fabric; however, the step is preferably performed by carrying out heating in a state where the surface of the intermediate transfer medium to which the ink jet dye textile printing ink composition is attached and the surface of the processed fabric are closely attached.

Due to this, it is possible to reduce the energy required for the transfer and to further improve the productivity of the dyed product. In addition, it is possible to further improve the color development of the obtained dyed product.

4-2. Second Method

In addition, it is also possible to manufacture the dyed product according to the present disclosure using, for example, the following method.

That is, it is possible to suitably manufacture the dyed product according to the present disclosure using a method, that is, using the second method, having an ink composition attaching step in which an ink jet dye textile printing ink composition containing a dye and water is applied to a processed fabric obtained by carrying out processing using the processing liquid composition of the present disclosure on a fabric including fibers having a hydroxyl group by an ink jet method to form an image, and a fixing step of heating the processed fabric on which the image is formed to fix the image.

According to this method, there is no need to use an intermediate transfer medium, which is advantageous from the viewpoints of the productivity of dyed products, resource saving, and energy saving.

The processing temperature in the fixing step is not particularly limited, but is preferably 160° C. or higher and 200° C. or lower and more preferably 170° C. or higher and 185° C. or lower.

Due to this, it is possible to more efficiently fix the dye while more effectively preventing unwanted denaturation, degradation, and the like of the processed fabric, constituent components of the ink jet dye textile printing ink composition, and the like.

The processing time of the fixing step is not particularly limited, but is preferably 30 seconds or more and 180 seconds or less and more preferably 40 seconds or more and 120 seconds or less.

Due to this, it is possible for the productivity of the dyed product to be superior while the dyeability of the dye with respect to the processed fabric is superior.

Although suitable embodiments of the present disclosure were described above, the present disclosure is not limited thereto.

For example, the processing method and textile printing method of the present disclosure may have steps other than the above, as necessary.

In addition, in the embodiments described above, description was given focusing on a case where the processing liquid composition of the present disclosure includes water in addition to the oxazoline group-containing polymer and the aromatic carboxylic acid, but the processing liquid composition of the present disclosure may include a solvent or dispersant other than water instead of water.

EXAMPLES

Next, a description will be given of specific Examples of the present disclosure.

5. Preparation of Processing Liquid Composition

Example 1

Each of the components shown in Table 1 was placed in a predetermined container in a predetermined ratio and mixed and stirred with a stirrer for 2 hours. After that, a processing liquid composition with the composition shown in Table 1 was obtained by filtering through a membrane filter with a pore diameter of 1 m.

Examples 2 to 22

Processing liquid compositions were prepared in the same manner as in Example 1 above, except that the kinds of components used in the preparation of the processing liquid compositions and the blending ratios of each component were changed to obtain the compositions shown in Table 1.

Comparative Example 1

A processing liquid composition was prepared in the same manner as in Example 1 above, except that the kinds of components used in the preparation of the processing liquid compositions and the blending ratios of each component were changed to obtain the composition shown in Table 1.

The compositions of the processing liquid compositions of each of the Examples and the Comparative Example are summarized in Table 1. In the table, Mowinyl 6960 (manufactured by Japan Coating Resin Co., Ltd.), which includes, as solid content, a polymer having a styrene-acrylic structure, without an oxazoline value, and with a glass transition temperature of −23° C., is referred to as "M6960", Epocros WS-300 (manufactured by NIPPON SHOKUBAI CO., LTD.), which includes, as solid content, an oxazoline group-containing polymer having an acrylic structure, an oxazoline value of 130, and a glass transition temperature of 90° C., is referred to as "WS-300", Epocros WS-500 (manufactured by NIPPON SHOKUBAI CO., LTD.), which includes, as solid content, an oxazoline group-containing polymer having an acrylic structure, an oxazoline value of 220, and a glass transition temperature of 50° C., is referred to as "WS-500", Epocros WS-700 (manufactured by NIPPON SHOKUBAI CO., LTD.), which includes, as solid content, an oxazoline group-containing polymer having an acrylic structure, an oxazoline value of 220, and a glass transition temperature of 50° C., is referred to as "WS-700", Epocros K-2010E (manufactured by NIPPON SHOKUBAI CO., LTD.), which includes, as solid content, an oxazoline group-containing polymer having a styrene-acrylic structure, an oxazoline value of 550, and a glass transition temperature of −150° C., is referred to as "K-2010E", Epocros K-2020E (manufactured by NIPPON SHOKUBAI CO., LTD.), which includes, as solid content, an oxazoline group-containing polymer having a styrene-acrylic structure, an oxazoline value of 550, and a glass transition temperature of 0° C., is referred to as "K-2020E", Epocros K-2035E (manufactured by NIPPON SHOKUBAI CO., LTD.), which includes, as solid content, an oxazoline group-containing polymer having a styrene-acrylic structure, an oxazoline value of 550, and a glass transition temperature of 50° C., is referred to as "K-2035E", sodium benzoate as aromatic carboxylic acid is referred to as "NaBA", benzoic acid as aromatic carboxylic acid is referred to as "BA", sodium 1-naphthalene carboxylate as aromatic carboxylic acid is referred to as "Na1N", sodium 2-naphthalene carboxylate as aromatic carboxylic acid is referred to as "Na2N", Carbodilite V-02-L2 (manufactured by Nisshinbo Chemical Inc.) as a polyvalent carbodiimide compound with an NCN equivalent of 385 is referred to as "V-02-L2", and malic acid is referred to as "MA". The solid concentration of Mowinyl 6960 (manufactured by Japan Coating Resin Co., Ltd.) is 45% by mass, the solid concentration of Epocros WS-300 (manufactured by NIPPON SHOKUBAI CO., LTD.) is 10% by mass, the solid concentration of Epocros WS-500 (manufactured by NIPPON SHOKUBAI CO., LTD.) is 39% by mass, the solid concentration of Epocros WS-700 (manufactured by NIPPON SHOKUBAI CO., LTD.) is 25% by mass, the solid concentration of Epocros K-2010E (manufactured by NIPPON SHOKUBAI CO., LTD.) is 40% by mass, the solid concentration of Epocros K-2020E (manufactured by NIPPON SHOKUBAI CO., LTD.) is 40% by mass, and the solid concentration of Epocros K-2035E (manufactured by NIPPON SHOKUBAI CO., LTD.) is 40% by mass. The pH of the processing liquid compositions of each of the Examples at 25° C. were all values in a range of 8 or more and 10 or less.

TABLE 1

| | Content ratio [% by mass] | | | | | | |
|---|---|---|---|---|---|---|---|
| | Oxazoline group-containing polymer | | | | | | |
| | M6960 | WS-300 | WS-500 | WS-700 | K-2010E | K-2020E | K-2035E |
| Example 1 | — | 7.0 | — | — | — | — | — |
| Example 2 | — | 10.0 | — | — | — | — | — |
| Example 3 | — | 20.0 | — | — | — | — | — |
| Example 4 | — | — | 5.0 | — | — | — | — |
| Example 5 | — | — | — | 8.0 | — | — | — |
| Example 6 | — | — | — | — | 5.0 | — | — |
| Example 7 | — | — | — | — | — | 5.0 | — |
| Example 8 | — | — | — | — | — | 5.0 | — |
| Example 9 | — | — | — | — | — | — | 5.0 |
| Example 10 | — | — | — | — | — | — | 5.0 |
| Example 11 | — | — | — | — | — | — | 5.0 |
| Example 12 | — | — | — | — | — | — | 10.0 |
| Example 13 | — | — | — | — | — | — | 10.0 |
| Example 14 | — | — | — | — | — | — | 10.0 |
| Example 15 | — | — | — | — | — | — | 15.0 |
| Example 16 | — | — | — | — | — | — | 5.0 |
| Example 17 | — | — | — | — | — | — | 5.0 |
| Example 18 | — | — | — | — | — | — | 5.0 |
| Example 19 | — | — | — | — | — | — | 5.0 |
| Example 20 | — | — | — | — | — | — | 5.0 |
| Example 21 | — | — | — | — | — | — | 5.0 |
| Example 22 | — | — | — | — | — | — | 5.0 |

TABLE 1-continued

| | | | | | | | |
|---|---|---|---|---|---|---|---|
| Comparative Example 1 | 4.4 | — | — | — | — | — | — |

| | Content ratio [% by mass] | | | | | | |
|---|---|---|---|---|---|---|---|
| | Aromatic carboxylic acid | | | | Polyvalent carbodiimide compound | Non-aromatic organic acid | Pure water |
| | NaBA | BA | Na1N | Na2N | V-02-L2 | MA | |
| Example 1 | 1.0 | — | — | — | — | — | 92.0 |
| Example 2 | 1.0 | — | — | — | — | — | 89.0 |
| Example 3 | 1.0 | — | — | — | — | — | 79.0 |
| Example 4 | 1.0 | — | — | — | — | — | 94.0 |
| Example 5 | 1.0 | — | — | — | — | — | 91.0 |
| Example 6 | 1.0 | — | — | — | — | — | 94.0 |
| Example 7 | 1.0 | — | — | — | — | — | 94.0 |
| Example 8 | 10.0 | — | — | — | — | — | 85.0 |
| Example 9 | 1.0 | — | — | — | — | — | 94.0 |
| Example 10 | 10.0 | — | — | — | — | — | 85.0 |
| Example 11 | 20.0 | — | — | — | — | — | 75.0 |
| Example 12 | 0.1 | — | — | — | — | — | 89.9 |
| Example 13 | 1.0 | — | — | — | — | — | 89.0 |
| Example 14 | 10.0 | — | — | — | — | — | 80.0 |
| Example 15 | 1.0 | — | — | — | — | — | 84.0 |
| Example 16 | — | 1.0 | — | — | — | — | 94.0 |
| Example 17 | — | — | 1.0 | — | — | — | 94.0 |
| Example 18 | — | — | — | 1.0 | — | — | 94.0 |
| Example 19 | 1.0 | — | — | — | 5.0 | — | 89.0 |
| Example 20 | 1.0 | — | — | — | 5.0 | 0.05 | 88.95 |
| Example 21 | 1.0 | — | — | — | 1.0 | 0.05 | 92.95 |
| Example 22 | 1.0 | — | — | — | 15.0 | 0.05 | 78.95 |
| Comparative Example 1 | 1.0 | — | — | — | — | — | 94.6 |

6. Preparation of Ink Jet Dye Textile Printing Ink Composition

Preparation Example 1

15.0 parts by mass of C.I. Disperse Blue 359 as a disperse dye, 15.0 parts by mass of acrylic-styrene copolymer resin (SOLSPERSE 43000, manufactured by The Lubrizol Corporation), and 70.0 parts by mass of pure water were dispersed in a paint shaker using 0.3 mm zirconia beads to obtain a dye dispersion solution.

30.0 parts by mass of the obtained dye dispersion solution, 0.8 parts by mass of BYK-348 as a surfactant, 15.0 parts by mass of glycerin as a water-soluble organic solvent, 10.0 parts by mass of propylene glycol as a water-soluble organic solvent, 0.2 parts by mass of Proxel XL2 as a preservative, and 44.0 parts by mass of pure water were placed in a predetermined container and mixed and stirred with a stirrer for 2 hours. After that, a cyan ink jet dye textile printing ink composition was obtained by filtering through a membrane filter with a 1 μm pore diameter.

Preparation Example 2

15.0 parts by mass of C.I. Disperse Red 60 as a disperse dye, 15.0 parts by mass of acrylic-styrene copolymer resin (SOLSPERSE 43000, manufactured by The Lubrizol Corporation), and 70.0 parts by mass of pure water were dispersed in a paint shaker using 0.3 mm zirconia beads to obtain a dye dispersion solution.

43.3 parts by mass of the obtained dye dispersion solution, 0.8 parts by mass of BYK-348 as a surfactant, 10.0 parts by mass of glycerin as a water-soluble organic solvent, 10.0 parts by mass of propylene glycol as a water-soluble organic solvent, 0.2 parts by mass of Proxel XL2 as a preservative, and 35.7 parts by mass of pure water were placed in a predetermined container and mixed and stirred with a stirrer for 2 hours. After that, a magenta ink jet dye textile printing ink composition was obtained by filtering through a membrane filter with a 1 μm pore diameter.

Preparation Example 3

15.0 parts by mass of C.I. Disperse Yellow 54 as a disperse dye, 15.0 parts by mass of acrylic-styrene copolymer resin (SOLSPERSE 43000, manufactured by The Lubrizol Corporation), and 70.0 parts by mass of pure water were dispersed in a paint shaker using 0.3 mm zirconia beads to obtain a dye dispersion solution.

20.0 parts by mass of the obtained dye dispersion solution, 0.8 parts by mass of BYK-348 as a surfactant, 15.0 parts by mass of glycerin as a water-soluble organic solvent, 10.0 parts by mass of propylene glycol as a water-soluble organic solvent, 0.2 parts by mass of Proxel XL2 as a preservative, and 54.0 parts by mass of pure water were placed in a predetermined container and mixed and stirred with a stirrer for 2 hours. After that, a yellow ink jet dye textile printing ink composition was obtained by filtering through a membrane filter with a 1 μm pore diameter.

7. Manufacturing of Dyed Products

Dyed products were manufactured using the processing liquid composition of Example 1 in the following manner.

First, the processing liquid composition of Example 1 above and the three ink jet dye textile printing ink compositions prepared in the above-described section 6 were combined to form a composition set.

Next, a cotton broadcloth (#4000), manufactured by Nisshinbo Chemical Inc., was prepared as a fabric and immersed in the processing liquid composition of Example 1.

Next, the amount of the processing liquid composition applied to the fabric was adjusted to obtain a drawing ratio of 80% using a mangle roller, a heating process was performed at 120° C. for 2 minutes, and a heating process was further performed at 170° C. for 1 minute.

After that, a processed fabric was obtained by performing water rinsing for 5 minutes and carrying out further drying.

Meanwhile, using an ink jet printer (PX-G930 manufactured by Seiko Epson Corporation), the three ink jet dye textile printing ink compositions forming the composition set according to Example 1 were ejected by the ink jet method onto a surface provided with a coated layer of coated paper (Transjet Sportsline 1254, manufactured by Cham Paper Group AG) as the intermediate transfer medium and an image was formed having three regions to which the three ink jet dye textile printing ink compositions were respectively applied without overlapping each other. All of the three regions described above were made into a filled pattern with conditions of a resolution of 720 dpi horizontally and 720 dpi vertically, 100% duty, and an ink strike amount of 12 mg/inch$^2$.

The intermediate transfer medium on which the image described above was formed and the processed fabric were made to face each other and heated and pressed at a temperature of 200° C. for 60 seconds with 4.2 N/cm$^3$ pressure using a heat pressing machine (TP-608M, manufactured by Taiyo Seiki Co., Ltd.) to heat-transfer the image formed on the intermediate transfer medium to the processed fabric and obtain a dyed product evaluation sample. At this time, the intermediate transfer medium was arranged such that the surface on which the image was formed was facing the processed fabric.

In addition, dyed products were manufactured in the same manner as described above, except that the processing liquid compositions of Examples 2 to 22 and Comparative Example 1 were used instead of the processing liquid composition of Example 1, respectively.

In addition, the dyed products were manufactured in the same manner as described above, except that instead of the processed fabric, a cotton broadcloth (#4000), manufactured by Nisshinbo Chemical Inc., a fabric not processed with the processing liquid composition, was used. The dyed product obtained in this manner was used as the dyed product according to Comparative Example 2.

8. Evaluation

8-1. Color Development

The dyed products according to each of the Examples and each of the Comparative Examples were evaluated for color development.

Specifically, for the recording sections of each color of each of the dyed products, OD values were determined from measurements using the FD-7 Spectrodensitometer (manufactured by Konica Minolta, Inc.), the ratio with respect to the OD value of the recording section of the dyed products according to Comparative Example 2 was determined, and evaluation was carried out according to the following criteria. That is, the higher the ratio, the better the color development. C or better was a good level.

Cyan Recording Section
AA: OD value is 200% or more of that of Comparative Example 2.
A: OD value is 180% or more and less than 200% of that of Comparative Example 2.
B: OD value is 160% or more and less than 180% of that of Comparative Example 2.
C: OD value is 140% or more and less than 160% of that of Comparative Example 2.
D: OD value is 130% or more and less than 140% of that of Comparative Example 2.
E: OD value is less than 130% of that of Comparative Example 2.

Magenta Recording Section
AA: OD value is 200% or more of that of Comparative Example 2.
A: OD value is 180% or more and less than 200% of that of Comparative Example 2.
B: OD value is 160% or more and less than 180% of that of Comparative Example 2.
C: OD value is 140% or more and less than 160% of that of Comparative Example 2.
D: OD value is 130% or more and less than 140% of that of Comparative Example 2.
E: OD value is less than 130% of that of Comparative Example 2.

Yellow Recording Section
AA: OD value is 200% or more of that of Comparative Example 2.
A: OD value is 180% or more and less than 200% of that of Comparative Example 2.
B: OD value is 160% or more and less than 180% of that of Comparative Example 2.
C: OD value is 140% or more and less than 160% of that of Comparative Example 2.
D: OD value is 130% or more and less than 140% of that of Comparative Example 2.
E: OD value is less than 130% of that of Comparative Example 2.

8-2. Abrasion Resistance

The dyed products according to each of the Examples and each of the Comparative Examples were evaluated for abrasion resistance.

Specifically, each of the dyed products was left in conditions of 25° C. for one hour after manufacturing and, when the recording surface of the dyed product was rubbed 20 times with a cotton cloth under a load of 200 g using a GAKUSHIN-type Color Fastness Rubbing Tester AB-301 (manufactured by TESTER SANGYO CO., LTD.), the state of peeling of the recording surface and the state of ink transferring to the cotton cloth were visually confirmed and the abrasion resistance was evaluated according to the following criteria. The less color transferring and peeling, the better the abrasion resistance, and the better the abrasion resistance, the better the fastness. B or better was a good level.

A: No color transferring or peeling is observed.
B: Slight color transferring and peeling is observed.
C: Color transferring and peeling are clearly observed.

8-3. Resistance to Yellowing

The dyed products according to each of the Examples were evaluated for the resistance to yellowing.

Specifically, the white area portions of the dyed products according to each of the Examples were visually observed and the resistance to yellowing was evaluated according to the following criteria. B or better was a good level.

A: No yellowing of the material is observed.
B: Yellowing of the material is slightly observed.
C: Yellowing of the material is clearly observed.

These results are summarized in Table 2.

TABLE 2

|  | Color development | | | Abrasion | Resistance |
|---|---|---|---|---|---|
|  | Cyan | Magenta | Yellow | resistance | to yellowing |
| Example 1 | D | D | D | B | A |
| Example 2 | C | C | D | B | A |
| Example 3 | C | C | C | A | A |
| Example 4 | C | C | C | B | A |
| Example 5 | C | C | C | B | A |
| Example 6 | C | C | C | B | A |
| Example 7 | A | A | A | A | A |
| Example 8 | A | A | B | A | A |
| Example 9 | A | A | A | A | A |
| Example 10 | A | A | A | A | A |
| Example 11 | B | B | C | A | A |
| Example 12 | A | A | A | A | A |
| Example 13 | AA | A | A | A | A |
| Example 14 | A | B | B | A | A |
| Example 15 | AA | A | A | A | A |
| Example 16 | A | A | A | A | A |
| Example 17 | A | A | A | A | A |
| Example 18 | A | A | A | A | A |
| Example 19 | A | A | A | A | B |
| Example 20 | A | A | A | A | A |
| Example 21 | A | A | A | A | A |
| Example 22 | A | A | A | A | B |
| Comparative Example 1 | E | E | E | B | A |
| Comparative Example 2 | E | E | E | B | A |

As is clear from Table 2, excellent results were obtained with the present disclosure. In contrast, with the Comparative Examples, satisfactory results were not obtained.

In addition, dyed products were manufactured in the same manner as in the Examples and each of the Comparative Examples, except that #4700 (manufactured by Nisshinbo Chemical Inc.), T40 (manufactured by Nisshinbo Chemical Inc.), and P2816 (manufactured by Herdmans) were used as the fabrics including fibers having a hydroxyl group and, when evaluated in the same manner as above, the same results as described above were obtained.

What is claimed is:

1. A processing liquid composition subjected to textile printing and which is used by being attached to a fabric including fibers having a hydroxyl group, the composition comprising:
    an oxazoline group-containing polymer; and
    an aromatic carboxylic acid.
2. The processing liquid composition according to claim 1, wherein an oxazoline value of the oxazoline group-containing polymer is 100 or more and 600 or less.
3. The processing liquid composition according to claim 1, wherein a content ratio of the oxazoline group-containing polymer in the processing liquid composition is 1.0% by mass or more and 10.0% by mass or less.
4. The processing liquid composition according to claim 1, wherein a content ratio of the aromatic carboxylic acid in the processing liquid composition is 0.1% by mass or more and 20.0% by mass or less.
5. The processing liquid composition according to claim 1, wherein the aromatic carboxylic acid is one or more selected from the group consisting of benzoic acid, 1-naphthalene carboxylic acid, 2-naphthalene carboxylic acid, and salts thereof.
6. The processing liquid composition according to claim 1, wherein the oxazoline group-containing polymer is a resin having a styrene-acrylic structure.
7. The processing liquid composition according to claim 1, wherein a glass transition temperature of the oxazoline group-containing polymer is 0° C. or higher.
8. The processing liquid composition according to claim 1, wherein $0.1 \leq XP/XA \leq 40$, here a content ratio of the oxazoline group-containing polymer in the processing liquid composition is XP [% by mass] and a content ratio of the aromatic carboxylic acid in the processing liquid composition is XA [% by mass].
9. A composition set comprising:
    the processing liquid composition according to claim 1; and
    an ink jet dye textile printing ink composition containing a dye and water.
10. The composition set according to claim 9, wherein the dye is a disperse dye.
11. A processing method comprising:
    a processing liquid attaching step of attaching the processing liquid composition according to claim 1 to a fabric including fibers having a hydroxyl group.
12. A textile printing method comprising:
    an ink composition attaching step of applying an ink jet dye textile printing ink composition containing a dye and water to an intermediate transfer medium by an ink jet method to form an image; and
    a transfer step of heating the intermediate transfer medium and a processed fabric, which is obtained by carrying out processing using the processing liquid composition according to claim 1 on a fabric including fibers having a hydroxyl group, in a state where the intermediate transfer medium and the processed fabric face each other such that the image is transferred to the processed fabric.

* * * * *